United States Patent [19]
Nielsen

[11] Patent Number: 6,108,688
[45] Date of Patent: Aug. 22, 2000

[54] SYSTEM FOR REMINDING A SENDER OF AN EMAIL IF RECIPIENT OF THE EMAIL DOES NOT RESPOND BY A SELECTED TIME SET BY THE SENDER

[75] Inventor: Jakob Nielsen, Atherton, Calif.

[73] Assignee: Sun Microsystems, Inc., Palo Alto, Calif.

[21] Appl. No.: 08/662,898

[22] Filed: Jun. 12, 1996

[51] Int. Cl.[7] .......................... G06F 15/16; G06F 15/173
[52] U.S. Cl. .......................... 709/206; 709/207; 709/224
[58] Field of Search .............................. 345/200.36, 673; 455/26.1; 379/201; 358/402; 340/825.05; 364/400; 709/206, 207, 224

[56] References Cited

U.S. PATENT DOCUMENTS

| | | | |
|---|---|---|---|
| 5,057,935 | 10/1991 | Williams | 358/402 |
| 5,245,532 | 9/1993 | Mourier | 364/400 |
| 5,377,354 | 12/1994 | Scannell et al. | 395/673 |
| 5,493,692 | 2/1996 | Theimer et al. | 455/26.1 |
| 5,652,789 | 7/1997 | Miner et al. | 379/201 |
| 5,675,733 | 10/1997 | Williams | 395/200.36 |

OTHER PUBLICATIONS

Townsend et al, "Microsoft Office 6 in 1", 1994, pp. 530–531.

*Primary Examiner*—Le Hien Luu
*Attorney, Agent, or Firm*—Townsend and Townsend and Crew LLP

[57] ABSTRACT

A system for warning the sender of e-mail messages if the messages are not received is described. The system permits the sender of a message to designate whether the sender wishes to be warned in case the message is not opened by the recipient prior to a time and date specified by the sender. The sender's system maintains a database of such messages, and automatically monitors incoming messages and updates the database as responses are received from recipients of messages. If a response is not received from a recipient prior to the specified date, the system generates a warning message to the sender.

27 Claims, 4 Drawing Sheets

SYSTEM FOR REMINDING A SENDER OF AN EMAIL IF RECIPIENT OF THE EMAIL DOES NOT RESPOND BY A SELECTED TIME SET BY THE SENDER

BACKGROUND OF THE INVENTION

This invention relates primarily to software. In particular, it relates to electronic mail ("e-mail") systems, and to techniques in such systems for guaranteeing the delivery of messages.

In an e-mail system, it is sometimes essential to deliver a message to a recipient before a certain time, or just to assure delivery of the information. For example, the addressee of a message might be scheduled to give a presentation at a set time, and the sender must inform the addressee about the availability of a product, a change in the presentation, or some other information before the start of the presentation. Other examples are the scheduling of meetings, arranging for the delivery of agreements, etc. Conventional e-mail systems operating across company or local area network boundaries do not allow the senders of messages to determine whether their messages have been read. As a result, the sender of a message often must telephone the recipient to verify that the needed information has not only arrived at the recipient's system, but has been reviewed by the recipient.

In conventional e-mail systems, messages are delivered in "envelopes" which are then "opened" by the recipient to be read. Many e-mail systems allow a sender to check a separate database to see if a message has been read. Some proprietary e-mail systems include an acknowledgement feature that allows the recipient's e-mail system to send a notification to the sender when the recipient has opened the message. E-mail systems with acknowledgement features include Apple Computer's AppleLink™ and the International Business Machines' V-Net System™.

Prior art e-mail systems of this type have at least two disadvantages. First, such e-mail systems do not work across proprietary boundaries. Thus, a sender of a V-Net message cannot address a user of some other system and receive an automatic acknowledgement notification. Second, even when such systems are used wholly within a proprietary environment itself, the sender of a message must remember to look for the acknowledgement notification. Furthermore, the need to take corrective action, for example by telephoning the recipient, faxing him a copy of the message, etc., only arises when the acknowledgement notification has not arrived at the sender's system before the deadline. The absence of receiving a notification, particularly among the many notifications which are otherwise received and not received, is a subtle event and easily overlooked.

SUMMARY OF THE INVENTION

This invention provides the sender of an e-mail message with the capability of automatically generating a warning message on the sender's system if the recipient of the message has not opened the message by a time specified by the sender. The invention works across proprietary boundaries and does not require the sender and the receiver to have the same e-mail software system. In the preferred embodiment, the sender's e-mail program is modified to include the capability of providing a warning in case the sender's e-mail message is not opened by the recipient. This capability can be presented to the sender in many different formats, but in one version is achieved by presenting a check box in the window used to compose an e-mail message. By checking the box the sender can choose to be warned if the message sent is not opened by a set time. Of course, other techniques, for example, special send commands, can also be employed.

In a preferred embodiment, an automatic method of providing to a sender of an electronic mail message a reminder if the message is not received by the recipient prior to a selected time includes the steps of designating a specified time for the sender to receive a response from the recipient, and adding to the message a tag requesting a response to the message. Preferably, the tag consists of a header to the message. A record of the message and the specified time are then stored on the sender's system, and the message sent, with the tag, to the recipient. The sender's system then monitors new messages incoming to the sender to detect at least one of two conditions. First, the system looks for new messages which have a tag corresponding to one of those sent by the sender. Second, the system checks for new messages without tags, but with corresponding subjects. If a new message is found with a tag or a corresponding subject, the record of the corresponding message in the sender's terminal is marked as acknowledged (or deleted), and all other records are left unchanged. This process is repeated for each incoming message. At the specified time (or slightly before it), the sender's system determines whether the record has been marked as acknowledged. If the record has not been marked, then the sender's system displays an indication to the sender that no response has been received to the message. Alternatively, rather than simply display a message, the sender's terminal can also place a telephone call, activate a pager, or take other action.

DESCRIPTION OF THE SPECIFIC EMBODIMENTS

In electronic mail systems commercially available today, senders are able to send messages to recipients over a variety of kinds of networks, including local area networks, wide area networks, the Internet, wireless networks, and the like. In such systems, senders prepare messages, typically on a computer terminal or computer system, and, using an electronic mail program, address those messages to various recipients or groups of recipients. Typically, the messages arrive at the recipient's computer system or terminal with minimal information about the message. For example, the information initially displayed to the recipient may only include the name of the sender of the message, the time at which the message was transmitted, and the subject. By manipulating appropriate symbols on a user interface, the recipient may open the message and read its contents. Such electronic mail systems are widely available and well known, being supplied by many different companies, including Sun Microsystems, the assignee of this invention.

Such conventional systems do not warn the sender of a message if the recipient does not open it by a specified time. According to this invention, at least the sender's e-mail system is modified to include an option for the sender to be warned in case the recipient does not open the particular e-mail message by a time specified by the sender. In the preferred embodiment of an e-mail system according to this invention, a check box is provided in the window used to compose the e-mail message. By checking the box, the sender can choose to have the sender warned in case the recipient does not open the message by a date and time specified by the sender. In an alternative presentation of the user interface for the sender, differently labeled buttons on the user interface could be employed, for example, with one button being a normal "Send" button, and the other button being a "Send with a Nondelivery Warning" type button. Of course, other presentations, for example, using special function keys, a voice-activated command or the like, could also be employed.

In the preferred embodiment, both the sender and the recipient's e-mail programs are modified to provide the capability described below. It should be appreciated, however, that the invention can function with only the sender's e-mail program modified, and the recipient's e-mail program being of conventional design. This enables the system of this invention to be employed in a context in which both the invention, and prior art systems are employed.

Figure 1:
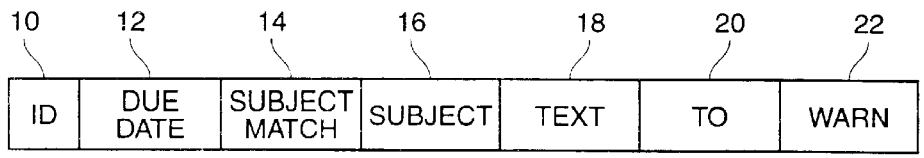
FIG. 1 is a diagram illustrating a record in a database relating to the sender's e-mail.

In the preferred embodiment, a database is maintained accessible by the sender's computer system or terminal (collectively referred to as "computer" hereafter) which database tracks the messages for which responses are desired. FIG. 1 illustrates the data structure of an entry in the database of the sender's system. In the example depicted seven fields are used, although it will be appreciated additional fields with other information, or fewer fields, may also be employed. In the exemplary embodiment, a database record for a message for which the system is to assure delivery includes seven fields. The first field is a message identification field 10, typically an automatically generated number which uniquely identifies the particular message with which it is associated. The second field 12 consists of the date and time by which the message must have been opened by the recipient's e-mail system. The third field 14, typically a one-bit field, is a flag designating whether subject matching is permitted. Subject matching is particularly useful for use with recipients whose systems have not been modified to include the capabilities of this invention. When subject matching is enabled, the sender's terminal checks incoming messages to determine if subject matches occur, and uses that information as the basis of the generating warnings to the sender.

Another field provided is a subject field 16. The subject field typically consists of a short text entry describing the subject of the message. The contents of the subject field provide the subject field provide the subject matching capability described above. A field 18 is provided which stores the text of the message, or optionally provides a pointer to the e-mail program's out box if copies of outgoing messages are kept. Of course, pointers to other messages available to the sender's system can also be employed. A field 20 is provided for the identification of the recipient, or the list of recipients, who must have received the message by the specified time. Finally, a warning field 22 is provided which is a pointer to a dialog box warning the sender that the message has not been opened by the specified time. Field 22 typically consists of a pointer to cause display on the sender's computer system of a message informing the sender that the message has not been opened. Alternatively, field 22 can contain pointers to a telephone system for telephoning a designated individual, paging the sender, or otherwise conveying information to the sender about the absence of delivery of the message.

The operation of a preferred embodiment of the system as invoked by the sender's e-mail system is described next. At the time the sender composes a message to be sent (or at a later time if desired), the sender can choose an option in the sender's e-mail system which presents a dialog box to the sender. The dialog box enables the sender to choose various options for the warning in the case of nondelivery.

Figure 2:
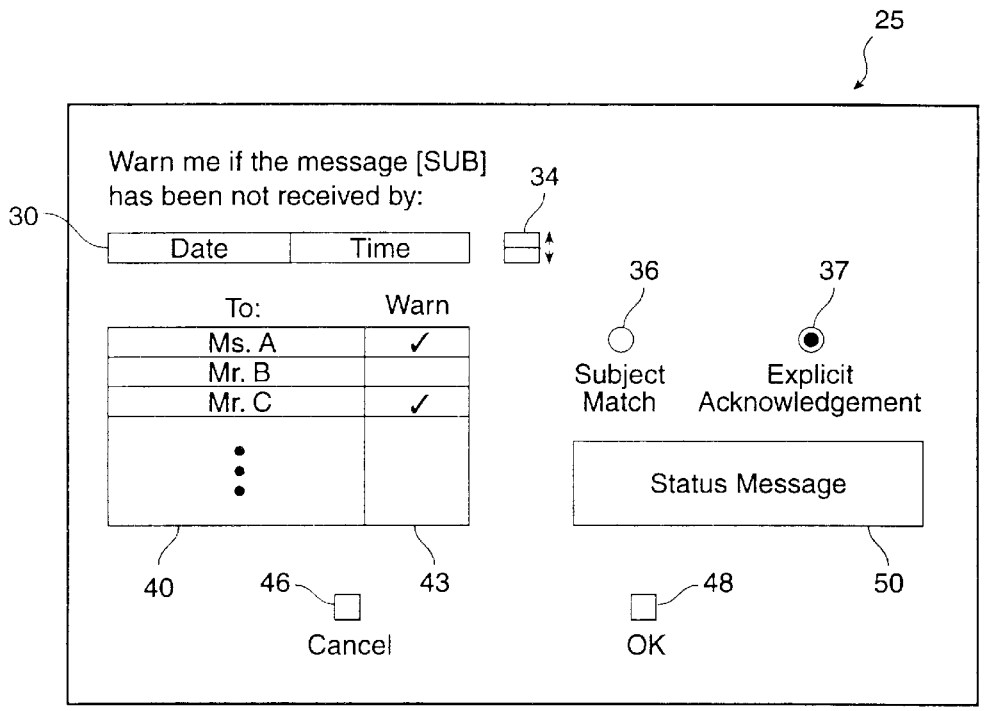
FIG. 2 is an illustration of an exemplary dialog box for display on the sender's system in conjunction with e-mail for which nondelivery is to be warned.

FIG. 2 illustrates a typical user interface or dialog box 25 for the sender's e-mail system. As shown in FIG. 2, the dialog box includes a message "Warn me if the message [subject] has not been received by:" Also in the dialog box are a date and time specification area 30 within which the date and time are to be set to warn the sender of nondelivery. In the preferred embodiment the date and time are set by default to be 24 hours from the current date and time. Appropriate controls are also introduced into the software to prevent the date and time to be set to any past date and time. A suitable user interface control 34 enables resetting the default date and time to a desired date and time.

The display also includes two radio buttons, one and only one of which is active at any given instant to specify how message checking is to occur. The first radio button 36, when active, enables the system to use subject matching, while the second radio button 37 requires the system to have an explicit acknowledgement before removing an entry from the sender's database, or marking an entry as being complete. These features are described in greater detail below in conjunction with an explanation of the manner of their implementation. In essence, however, the explicit acknowledgement feature removes, or marks as complete, an entry in the sender's database only when a recipient returns to the sender a message which includes a copy of the header sent to the recipient. This header uniquely identifies each and every message sent by the sender, and assures that only a single proper message within the sender's database is designated as completed. The subject matching button, on the other hand, uses certain text searching techniques, as described below, to determine which of the messages incoming to the sender are responses to messages sent by the sender for which acknowledgement is requested.

Also displayed on the user interface in FIG. 2 is a scrolling list of recipients 40 for the message being sent. Each recipient in the list includes a check box 43 next to it by which the sender of the message can determine whether a response from that recipient is necessary prior to the date and time set in field 30. At the time of initial display of the interface in FIG. 2 on the sender's system, all of the check boxes for the recipients listed in the "to:" are checked by default, while check boxes for the recipients specified in the "cc:" and "bcc:" headers are not checked. In the preferred embodiment, every recipient is listed only once, and recipients who are included in multiple headers are checked if they are included in at least one of the "to:" headers.

The interface also includes a "Cancel" button 46 and a "OK" button 48. If the sender clicks the cancel button, then the dialog box is removed from the screen, and no further action is taken with respect to the features of this invention. The e-mail message is sent conventionally using the prior art approach. On the other hand, if the sender clicks the "OK" button, then the dialog box is removed from the screen and the sender's e-mail program proceeds with the steps shown in FIG. 3.

Figure 3:
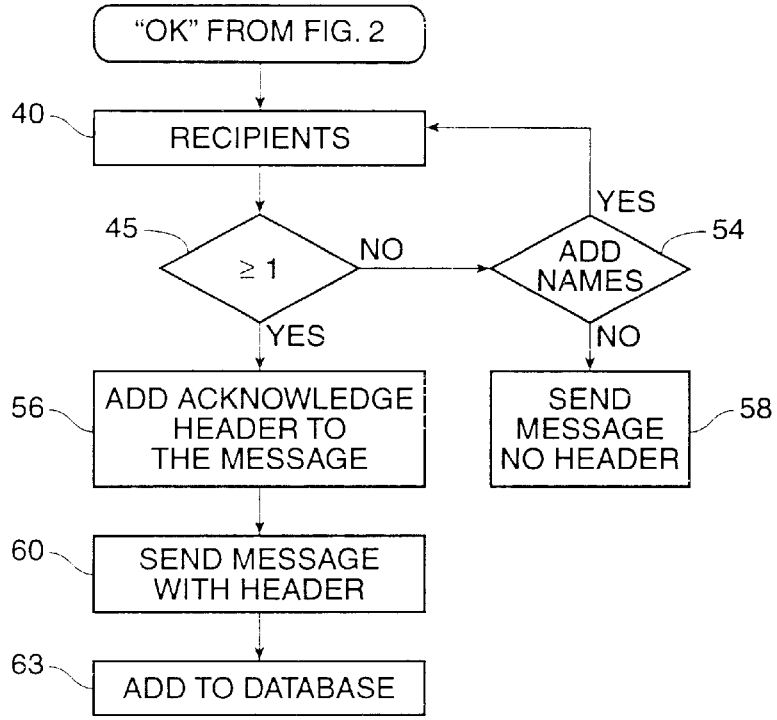
FIG. 3 is a flowchart illustrating the procedures carried out by the sender's e-mail program.

As shown in FIG. 3, the process begins with the clicking of the "OK" button from FIG. 2. Once that button is activated, the system checks the list of recipients shown in the box 40 in FIG. 2. At step 45, the system determines whether at least one recipient has been listed in box 40. If no recipients are shown in box 40, the system displays a message in a status message area 50 (see FIG. 2). In the preferred embodiment, the message text is "You have not specified any recipients who need to receive the message at a certain time. Do you still want to be warned in case of nondelivery?" followed by "Yes" and "No" buttons. If the sender chooses to add names at step 54, the recipient's box is presented and additional recipients can be added. On the other hand, if there are no recipients and the sender clicks "no," then the message is sent as described above, in a conventional manner as in a prior art e-mail system.

Once the list of recipients is complete, the program transfers to step 56. At this time, the sender's e-mail program adds a "X-Acknowledge-Please" header to the e-mail message, and sends the message using the prior art approach for sending an e-mail message. The only difference is that the e-mail message includes the header. The step of sending the message without a header, in the case where no recipients are checked, is shown by step 58. The case of sending the message with the header is shown by step 60. At the time the message is sent with the header, as shown by step 63, the appropriate entry is added to the sender's database.

Figure 4:
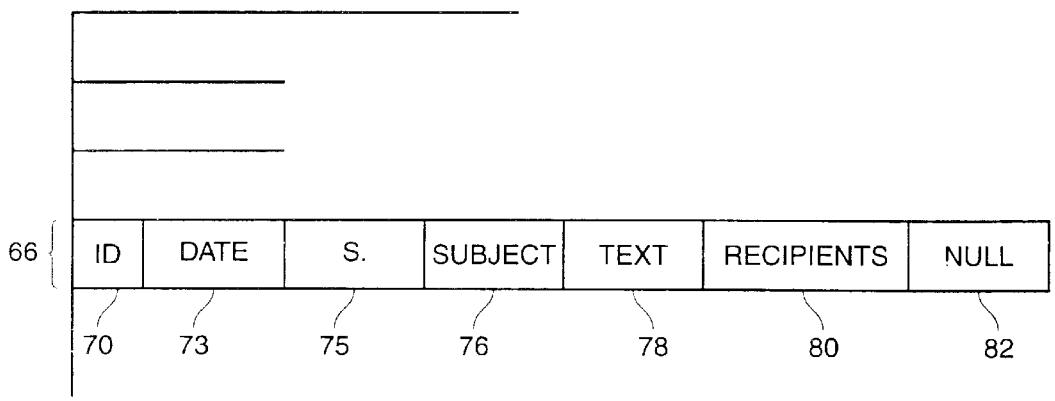
FIG. 4 is another illustration of the data structure of the sender's database.

FIG. 4 illustrates the structure for the entry to be added to the sender's database at step 63 from FIG. 3. As described above in conjunction with FIG. 1, the organization, width, and specific contents of the fields, can be varied. The field shown in FIG. 1 and FIG. 4 are for the purpose of illustration. FIG. 4 illustrates an hypothetical record 66 in the sender's database such as the entry for the sending of the message shown in the user interface of FIG. 2. The sender's database will include the ID field 70, which is set to the message identification number for the message sent. The date and time field 73 will be set to the date and time specified by the sender in box 30 (FIG. 2). The acknowledgement field 75 is set to be TRUE if the sender left the "check-matching-subject" radio button active and is set to be FALSE if the sender selected the "require-explicit-acknowledgement" radio button instead. The subject of the message is set in field 76 in the manner described below. The text of the message is set in field 78, or as explained above, a pointer is provided to the location where the text of the message is stored. The recipient's field 80 is set to be the list of recipients for which the warning field 43 (see FIG. 2) was checked. The last field 82 is set to the NULL pointer.

The technique for determining the core subject of the e-mail message is described in commonly-assigned copending U.S. patent application Ser. No. 08/628,441, filed Apr. 5, 1996, entitled "Method and Apparatus for Receiving Electronic Mail." In that patent application a system is described for scanning an e-mail message from the start until a line is found beginning with the text "subject." If no such line is found, then the core subject of the message is set to be the empty string. If such a line is found, then the core subject is generated from the line as follows. First, the system removes the text "subject" from the beginning of the line. The system then goes through a loop, or checks an associated table or database, to remove other undesired characters such as "re," "RE," "Re[n]:" (where n is an integer), etc. As matches are found, the matching characters are removed from the beginning of the line, and the process is repeated. Essentially, in this manner, or in an analogous manner, words having no applicability to the core subject of the message are removed from the message and the subject determined.

The preceding description has explained the manner by which the sender's e-mail system operates to send a message to a recipient. For the sender's system to automatically provide warnings to the sender that messages sent by the sender have not been opened, in the case of an explicit acknowledgement, and to provide a warning to the sender in case no incoming message has a subject match, in the case of subject matching being permitted, the sender's e-mail system must process incoming messages.

Figure 5:
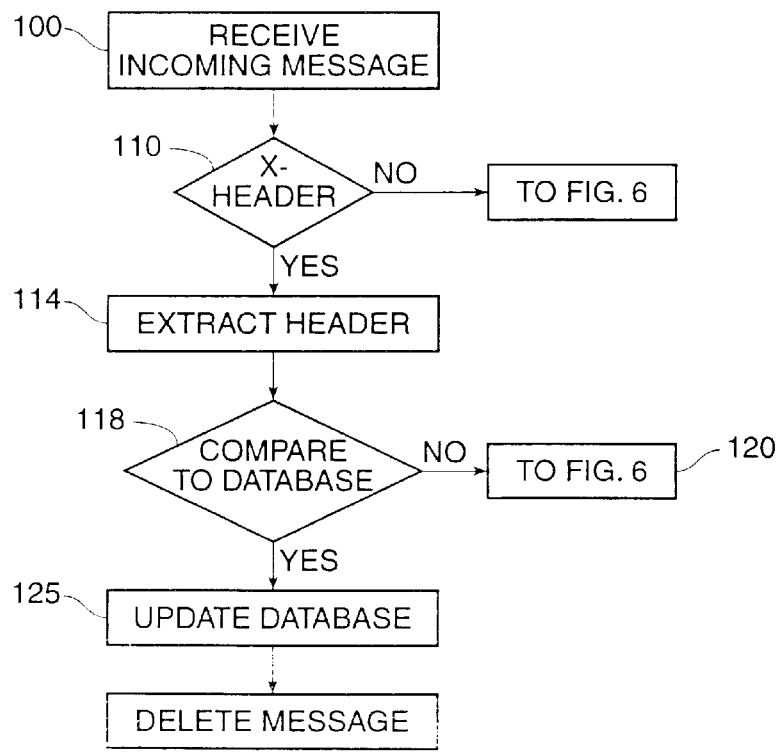
FIG. 5 is a flow diagram illustrating the operations performed when an incoming message to the sender is received.

FIG. 5 is a flowchart illustrating the manner by which incoming messages are processed by the sender's e-mail system. When the sender's e-mail program receives an incoming message 100, it checks 110 whether the message has an "X-Acknowledge-Please" header. If the message does not have such a header, the system procedures shift to FIG. 6. On the other hand, if the message does have a header, the program extracts the header 114 and looks it up in the sender's database 118. If the database includes a matching message ID, then the sender's program updates the database in a manner to be described below. On the other hand, if the header does not match any of the message IDs, control of the system moves to FIG. 6 as shown by block 120.

Returning to the case of the header of an incoming message matching that of a previously sent message, it indicates to the system that the incoming message is an acknowledgement of the earlier outgoing message for which the sender requested assured delivery. The program then matches the message "From:" field with the "Sender:" field of the outgoing message, and matches the "Reply to:" field of the incoming message with the list of recipients stored in the database field 80 (FIG. 4). If no matches are found, program control shifts to FIG. 6. On the other hand, if a match is found, the program continues with the step 125 of updating the database.

The existence of the matches found by the program cause the program to assume that the matching recipients of the sender's original e-mail have now seen the message. They are therefore removed from the database record. If, after removing the recipients from the database record, the list of recipients is empty, then the entire database record may be deleted, or marked as completed and saved for archival purposes. If the NULL field 82 (see FIG. 4) is different from the NULL pointer, then the dialog box to which it points is removed from the screen. At this point, the incoming e-mail message is deleted, and the program stops processing the message.

Figure 6:
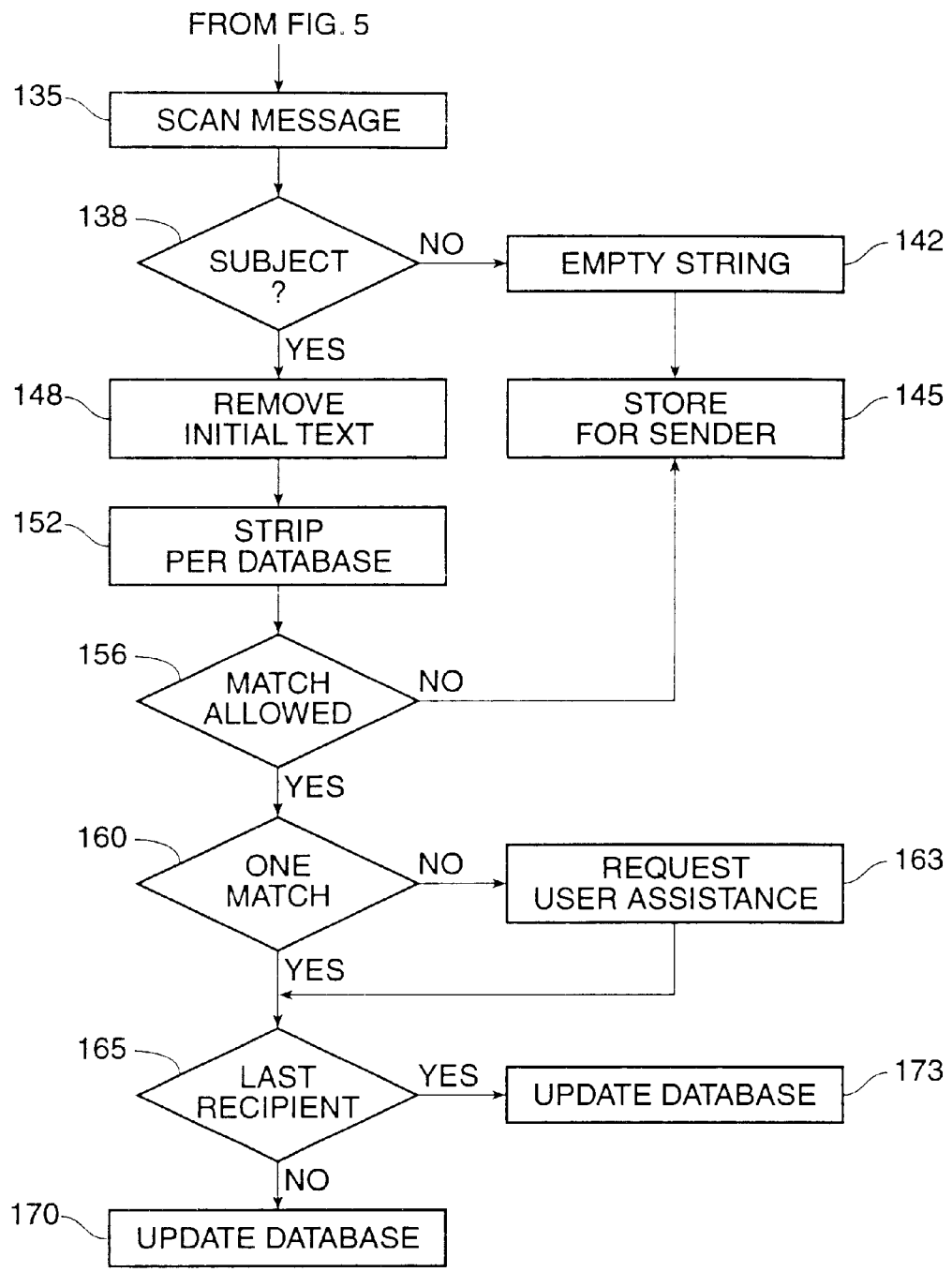
FIG. 6 is a flow diagram illustrating additional operations performed on incoming e-mail to the sender.

FIG. 6 illustrates the procedure by which incoming messages without acknowledgement headers are processed. If the sender has chosen to permit subject matching, then the system must extract the core subject from the message and look it up in the database in an effort to find a match. If no match is found, then the procedure is finished.

To determine whether a subject match occurs, the program can first check the subject match field 75 (FIG. 4). Those records where this field is false are removed from the matching set. If the matching set is empty after the removal, then the program is complete.

FIG. 6 illustrates the program operation for the circumstance in which no header is included with the message. In this case the system scans the message as shown by step 135. As shown by step 138, if a subject is not present, the subject string is set empty at step 142 and, at step 145, the message is stored for later review by the sender. On the other hand, if a subject is found, the initial text, such as "subject" is removed at step 148 and other undesired characters are stripped from the message at step 152. For all the matching records, the system then checks the subject matching field 75 (FIG. 4) at step 156 (FIG. 6). Those records where matching is not allowed are stored for review by the sender at step 145. If the set of matching records is empty after the removal of these messages where subject matching is not permitted, then the program is finished.

A test is then performed at step 160 to determine whether there is only one matching record, in other words that all matches are in the same database record, or whether the matches occur in different database records. If the matches occur in different database records, control transfers to step 163 and assistance is requested from the sender as to which of the matching outgoing messages is to be designated as acknowledged. If there is only a single matching record, then the program transfers to step 165 to determine whether the last recipient has now acknowledged receipt of the message. If the subject match for the message is not from the last recipient, control moves to step 170, and the database is updated to reflect the subject match of the specific individual responding to the message. On the other hand, if the subject match is the last recipient, the database is updated at step 173 and the entire database record can be deleted or marked as complete.

In the case of user assistance being requested at step 163, preferably a dialog box will be presented to the sender indicating that an incoming message matches several database records. The dialog box will ask the sender to select the most appropriate one. Typically, the dialog box will include a scrolling text field with the text of the incoming message, and a scrolling list of the matching messages. For each message a button is displayed together with the subject and the first desired number of lines of the text of the message. Also available is a button labeled "none of the above" to enable the sender to designate that the incoming message does not match any of the messages for which acknowledgement was requested.

Once one of the buttons has been selected, meaning that the sender has chosen to which outgoing message the incoming message is to be associated, an "OK" button can be chosen to complete the operation. Once the sender clicks "OK," then the dialog box is removed from the screen and the database updated. Control is then passed to the last recipient decision 165 and the remainder of the process carried out as described above.

Once all of these steps have been completed, the system operation proceeds in the conventional manner. That is, as is typically done, the incoming message will be added to the in box for the sender for later review.

The sender's e-mail program maintains assorted lists of deadline times for the due dates set for the records of the database for messages for which it should assure delivery. Whenever one of these deadlines is reached, if the corresponding record is still in the database, or still not marked as complete, the program will perform additional steps to warn the sender.

Figure 7:
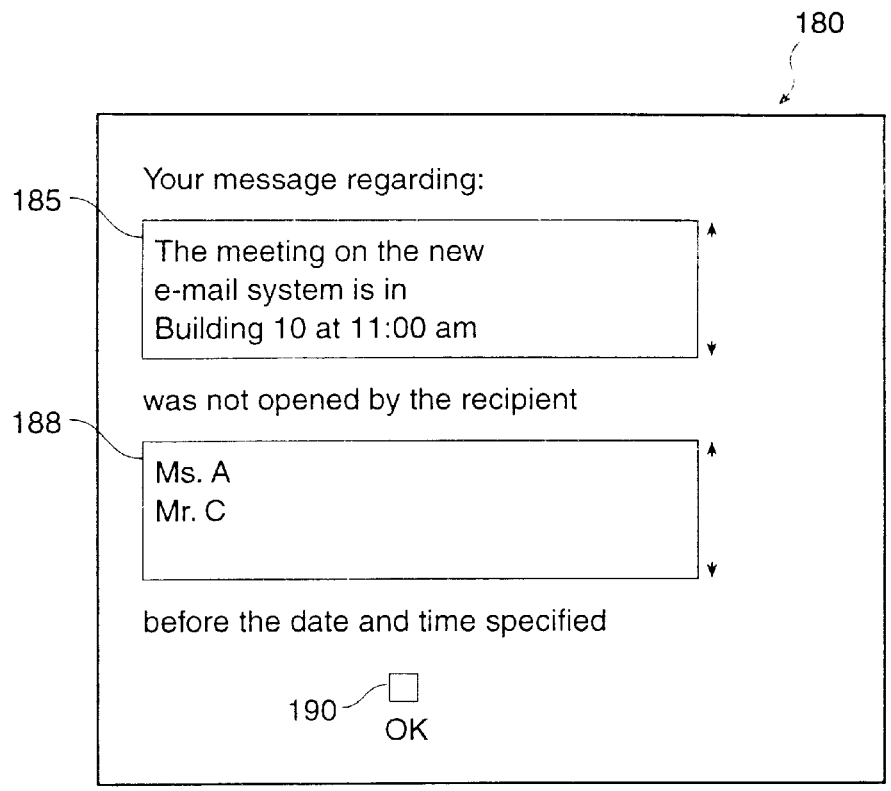
FIG. 7 is an illustration of a dialog box which can appear on the sender's computer system to warn the sender of nondelivery of a message.

FIG. 7 is an example of a dialog box which can be displayed on the sender's computer system by the program when a deadline time is reached. As shown in FIG. 7 the user interface includes text 180 warning the sender that the message has not been opened by the specified deadline. A scrolling text field 185 is provided to enable the sender to view the text of the message. Also included is a scrolling list 188 of the recipients for whom delivery was to be assured. The program sets the NULL pointer 82 (FIG. 4) to point to the dialog box displayed. Also provided is an OK button 190.

In addition to the dialog box, the program may optionally take additional steps to warn the sender that the message has not been opened by the intended deadline. These steps may include sending a signal to the sender's pager, sending a voice message to the sender's cellular telephone or office telephone, or performing any other action that may reach the sender to alert the sender of the nondelivery. Such additional options can readily be provided by the sender specifying additional details, for example, a pager number as a preference set in the system's e-mail.

When the sender clicks the OK button, the dialog box is removed from the screen, and the corresponding database record deleted from the database or marked as complete. If prior to the activation of the OK button the recipient acknowledges the message, the dialog box may be removed from the screen by the e-mail system itself. Optionally, the dialog box may contain a provision to enable the sender to have the original message resent to the recipients through some other delivery mechanism, for example a fax modem, the telephone, or some other means.

As evident from the description above, the system of this invention can operate with reduced utility even if the recipient's e-mail program has not been modified to work with the present invention. Using the subject matching technique described, the sender's e-mail program can recognize replies to a message, even from prior art e-mail systems. As also can be appreciated, however, the invention will function with greater efficiency if the recipient's e-mail program has been enhanced to accommodate this system.

Figure 8:
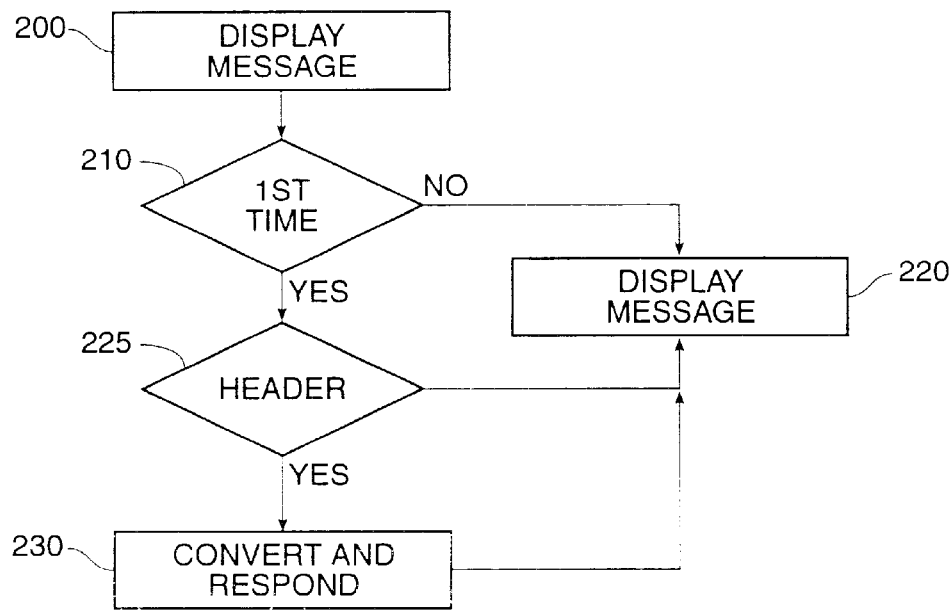
FIG. 8 is a flow diagram illustrating exemplary operation of the recipient's system.

FIG. 8 illustrates the modifications to the recipient's e-mail system to enable it to operate more efficiently with the sender's e-mail system described. As shown in FIG. 8, whenever a message 200 is displayed from the recipient's in box to the recipient, the steps depicted are performed. First, as shown by decision 210, the program checks whether the message has been seen previously, or whether it is a new message that has not been seen previously. If the message has been seen previously, then the recipient's e-mail system displays the e-mail message 220 in the manner of a conventional e-mail system. On the other hand, if this is the first time the message is being displayed, the system checks for the presence of the "X-Acknowledge-Please" header at step 225. If there is no header, then the message is displayed at step 220 as described above. If a header is present, however, then the program sends an acknowledgement message to the sender. The acknowledgement message is sent to the address given in the "replay to" header, if present. Otherwise, the acknowledgement is sent to the address given in the "sender" header or the "from" header.

As described above, the acknowledgement message has a body with the text "Your message was received" or words to that effect, and a subject heading corresponding to the subject heading of the incoming message. Upon completion of the sending of the header, the e-mail program continues processing the incoming message using prior art display and e-mail message technology.

The foregoing has been a description of a system for guaranteeing delivery of e-mail messages. It should be appreciated that modifications or variations may be made to the system without departing from the scope of the invention. The scope of the invention is set forth in the appended claims.

What is claimed is:

1. A computer implemented method of providing to a sender of an electronic mail message a reminder if the message is not received by the recipient prior to a selected time comprising:

designating a specified time for a response to the message;

adding to the message a tag requesting a response to the message;

storing a record of the message and the specified time;

sending the message and the tag to the recipient;

monitoring new messages incoming to the sender to detect whether a response to the message has been received;

prior to the specified time determining whether a response has arrived;

if a response has arrived, then designating the message as one to which a response has been received, and not displaying an indication to the sender that no response has been received to the message; and if no response has arrived, then displaying an indication to the sender that no response has been received to the message.

2. A method as in claim 1 wherein the step of monitoring new messages incoming to the sender to detect a response to the message comprises:

monitoring new messages incoming to the sender to detect at least one of two conditions:
(1) a new message having a corresponding tag;
(2) a new message without a tag;

in response to condition (1) marking the record of the corresponding message as acknowledged, and in response to (2) not marking any record as acknowledged.

3. A method as in claim 2 wherein the step of if no response has arrived, then displaying an indication to the sender that no response has been received to the message further comprises prior to the specified time determining whether the record has been marked.

4. A computer implemented method of providing to a sender of an electronic mail message a reminder if the message is not received by the recipient prior to a selected time comprising:

designating a specified time for the response;

adding to the message a tag requesting a response to the message;

storing a record of the message and the specified time;

sending the message and the tag to the recipient;

monitoring new messages incoming to the sender to detect at least one of two conditions:
(1) a new message having a corresponding tag;
(2) a new message without a tag;

in response to condition (1) marking the record of the corresponding message as acknowledged, and in response to (2) not marking any record as acknowledged;

prior to the specified time determining whether the record has been marked; and if the record has not been marked displaying an indication to the sender that no response has been received to the message and if the record has been marked, then not displaying an indication to the sender that no response has been received to the message.

5. A method as in claim 4 wherein the step of storing a record comprises adding the record to a database of messages for which delivery is to be monitored.

6. A method as in claim 4 wherein prior to the step of designating a specified time for the response, a step is provided of allowing the sender to determine whether any response to the message is needed.

7. A method as in claim 4 further comprising:

presenting to the sender a list of recipients for the message; and for each such recipient allowing the sender to choose whether the sender is to be warned if that recipient has not responded by the specified time.

8. A method as in claim 7 wherein the step of designating a specified time for the response is performed by presenting to the sender a time display which the sender may modify to set the specified time.

9. A computer implemented method of providing to a sender of an electronic mail message a reminder if the message is not received by the recipient prior to a selected time comprising:

designating a specified time for a response;

adding to the message a tag requesting a response to the message;

storing a record of the message and the tag;

sending the message and the tag to the recipient;

monitoring new messages incoming to the sender to detect at least one of three conditions:
(1) a new message having a corresponding tag;
(2) a new message without a tag, but with a subject heading corresponding to a heading on a message sent by the sender; and
(3) a new message without a tag and without a subject heading corresponding to a heading on a message sent by the sender;

in response to at least one of conditions (1) or (2) marking the record of the corresponding message as acknowledged, and in response to (3) not marking any record as acknowledged;

prior to the specified time determining whether the record has been marked; and if the record has not been marked, then displaying an indication to the sender that no response has been received to the message, if the record has been marked, then not displaying an indication to the sender that no response has been received to the message.

10. A method as in claim 9 further comprising presenting to the sender a choice of whether a match of subject headings will suffice as an acknowledgment.

11. A method as in claim 10 wherein following the step of presenting to the sender a choice of whether a match of subject headings will suffice as an acknowledgment a step is performed to determine whether the sender choose to permit a match of subject headings to serve as an acknowledgment, and if so, then in response to either one of conditions (1) or (2) marking the record of the corresponding message from the sender as acknowledged.

12. A method as in claim 9 further comprising:

presenting to the sender a list of recipients for the message; and for each such recipient allowing the sender to choose whether the sender is to be warned if that recipient has not responded by the specified time.

13. A method as in claim 12 wherein the step of designating a specified time for the response is performed by presenting to the sender a time display which the sender may modify to set the specified time.

14. A method as in claim 9 wherein the step of monitoring new messages without a tag but with a subject heading corresponding to a heading on a message sent by the sender comprises:

determining the sender of the new message;

matching the sender of the new message with an recipient of a message sent by the sender;

extracting the subject heading from the incoming message;

comparing the extracted subject heading with the subject headings of the records stored for messages sent to that recipient; and marking one record having a corresponding subject heading as acknowledged.

15. A method as in claim 9 wherein the step of if the record has not been marked displaying an indication to the sender that no response has been received to the message comprises displaying a message to the sender warning the sender that no response has been received.

16. A method as in claim 9 wherein the step of if the record has not been marked displaying an indication to the sender that no response has been received to the message comprises providing to the sender an audible warning that no answer has been received to the message.

17. A computer-readable storage medium for storing data for access by a computer program being executed on a data processing system, comprising:

a data structure stored on said medium for an electronic mail message comprising:

a message identifier;

a specified time by which a sender of the message must receive an acknowledgment; and at least one recipient for the message;

a list of at least one recipient for the message; and a designation for each such recipient which causes a warning to be displayed to the sender in the absence of a response, the absence of such a designation precluding a warning from being displayed to the sender.

18. A computer-readable storage medium as in claim 17 wherein the data structure further comprises a pointer to a warning notice to be displayed to the sender if the message is not acknowledged by the specified time.

19. A computer-readable storage medium as in claim 18 wherein the data structure further comprises an indication of the message text sent to the recipient.

20. A computer-readable storage medium as in claim 19 wherein the indication of the message text comprises the text itself.

21. A computer-readable storage medium as in claim 20 wherein the indication of the message text comprises a pointer to a location where the text is stored.

22. A computer-readable storage medium as in claim 21 wherein the data structure further includes an additional indicia of whether subject matching by sender's message system is permitted.

23. A computer system containing a user interface for the sender of an electronic mail message comprising:

an indicium allowing the user to choose whether the user wishes to be reminded if the recipient of the message does not respond to it by a selected time; and a user interface for the sender of an electronic mail message comprising:

an indicia allowing the user to choose whether the user wishes to be reminded if the recipient of the message does not respond to it by a selected time, the absence of such an indicia precluding a reminder to the user; and a display allowing the user to set the selected time.

24. A computer system as in claim 23 further comprising an object to allow the user to choose whether to require that a response to the message must contain at least a portion of a tag applied to the message when it was sent.

25. A computer system as in claim 24 further comprising an object to allow the user to choose whether to allow a new message received by the sender and having a common subject to be considered as a response to the message.

26. A computer system for the sender of an electronic mail message as in claim 25 further comprising a further indicia allowing the user to designate at least two recipients, and for each recipient choose whether the user wishes to be reminded if the recipient of the message does not respond to it by the selected time.

27. A computer system as in claim 26 wherein the indicia comprises a user operable control displayed on a monitor for the sender of an electronic mail message to allow the sender to control the indicium.

* * * * *